US011622242B2

(12) United States Patent
Prasad et al.

(10) Patent No.: US 11,622,242 B2
(45) Date of Patent: Apr. 4, 2023

(54) MACHINE LEARNING BASED MULTICAST USER GROUPING

(71) Applicant: Nokia Technologies Oy, Espoo (FI)

(72) Inventors: Athul Prasad, Naperville, IL (US); Amitabha Ghosh, Buffalo Grove, IL (US); Gilsoo Lee, Naperville, IL (US); Jie Chen, Naperville, IL (US); Jun Tan, Glenview, IL (US)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 17/191,330

(22) Filed: Mar. 3, 2021

(65) Prior Publication Data

US 2022/0286819 A1      Sep. 8, 2022

(51) Int. Cl.
| | | |
|---|---|---|
| *H04W 4/08* | (2009.01) | |
| *H04L 1/1812* | (2023.01) | |
| *H04L 1/1822* | (2023.01) | |
| *H04W 28/02* | (2009.01) | |
| *H04W 48/04* | (2009.01) | |

(Continued)

(52) U.S. Cl.
CPC .............. *H04W 4/08* (2013.01); *H04L 1/1812* (2013.01); *H04L 1/1822* (2013.01); *H04W 28/0268* (2013.01); *H04W 48/04* (2013.01); *H04W 48/12* (2013.01); *H04W 48/16* (2013.01); *H04W 72/042* (2013.01)

(58) Field of Classification Search
CPC ... H04W 4/08; H04W 28/0268; H04W 48/04; H04W 48/12; H04W 48/16; H04W 72/042; H04L 1/1812; H04L 1/1822

USPC ........................................................ 370/484
See application file for complete search history.

(56) References Cited

U.S. PATENT DOCUMENTS

| | | |
|---|---|---|
| 7,966,414 B2 | 6/2011 | Cinghita et al. |
| 9,626,628 B2 | 4/2017 | Dasgupta et al. |

(Continued)

FOREIGN PATENT DOCUMENTS

| | | |
|---|---|---|
| EP | 3095212 A1 | 11/2016 |
| EP | 3723395 A1 | 10/2020 |

(Continued)

OTHER PUBLICATIONS

International Search Report and Written Opinion received for corresponding Patent Cooperation Treaty Application No. PCT/EP2022/052553, dated Jun. 1, 2022, 13 pages.

(Continued)

*Primary Examiner* — Rownak Islam
(74) *Attorney, Agent, or Firm* — Harrington & Smith

(57) ABSTRACT

In accordance with example embodiments of the present disclosure there is at least a method and apparatus to perform communicating between a network node and a user equipment of a communication network, authorization for the user equipment to join a group of user equipment to enable the user equipment to receive multicast configurations for multicast signaling authorized for the group, wherein the authorization is based on configurations in common between the user equipment and the group of user equipment; and based on the joining, utilizing the configurations in common to produce signaling between the communication network and the user equipment to receive multicast configurations for the multicast signaling authorized for the group.

20 Claims, 8 Drawing Sheets

(51) Int. Cl.
  *H04W 48/12* (2009.01)
  *H04W 48/16* (2009.01)
  *H04W 72/04* (2023.01)

(56) References Cited

U.S. PATENT DOCUMENTS

| | | | | |
|---|---|---|---|---|
| 2018/0092133 | A1* | 3/2018 | Starsinic | H04W 4/08 |
| 2019/0370687 | A1 | 12/2019 | Pezzillo et al. | |
| 2020/0323024 | A1 | 10/2020 | Huang et al. | |
| 2021/0028890 | A1* | 1/2021 | Rico Alvarino | H04W 76/40 |
| 2021/0045017 | A1 | 2/2021 | Takeda et al. | |
| 2022/0022162 | A1* | 1/2022 | Liu | H04W 72/005 |

FOREIGN PATENT DOCUMENTS

| | | | |
|---|---|---|---|
| WO | 2015/107338 | A1 | 7/2015 |
| WO | 2017/198193 | A1 | 11/2017 |
| WO | 2019/091586 | A1 | 5/2019 |
| WO | WO-2021233225 | A1 * | 11/2021 |

OTHER PUBLICATIONS

"Discussion on mechanisms to support group scheduling for RRC_CONNECTED Ues", 3GPP TSG RAN WG1 #102-e, R1-2005406, Agenda: 8.12.1, vivo, Aug. 17-28, 2020, 3 pages.

"3rd Generation Partnership Project; Technical Specification Group Radio Access Network; NR;Physical layer procedures for data (Release 16)", 3GPP TS 38.214, V16.3.0, Sep. 2020, pp. 1-166.

"3rd Generation Partnership Project; Technical Specification Group Radio Access Network; NR;Multiplexing and channel coding (Release 16)", 3GPP TS 38.212, V16.3.0, Sep. 2020, pp. 1-152.

"3rd Generation Partnership Project; Technical Specification Group Radio Access Network; NR;Physical layer procedures for control(Release 16)", 3GPP TS 38.213, V16.3.0, Sep. 2020, pp. 1-179.

"WID Revision: NR Multicast and Broadcast Services", 3GPP TSG RAN Meeting #88-e, RP-201038, Agenda : 9.10.8, Huawei, Jun. 29-Jul. 3, 2020, 6 pages.

"LTE-Advanced Pro Broadcast Radio Access NetworkBenchmark", Deliverable D3.1, Version v1.1, 5G-Xcast_D3.1_v1.1, Jun. 29, 2018, 140 pages.

"3rd Generation Partnership Project; Technical Specification Group Radio Access Network; NR;Radio Resource Control (RRC) protocol specification(Release 16)", 3GPP TS 38.331, V16.2.0, Sep. 2020, pp. 1-921.

"3rd Generation Partnership Project; Technical Specification Group Radio Access Network; NR;Physical channels and modulation(Release 16)", 3GPP TS 38.211, V16.3.0, Sep. 2020, pp. 1-133.

Guo et al., "A Method to Tailor Broadcasting and MulticastingTransmission in 5G New Radio", European Conference on Networks and Communications (EuCNC), Jun. 18-21, 2019, pp. 364-368.

Montalban et al., "Multimedia Multicast Services in5G Networks: Subgrouping and Non-Orthogonal Multiple Access Techniques", IEEE Communications Magazine, vol. 56, No. 3, Mar. 2018, pp. 96-103.

\* cited by examiner

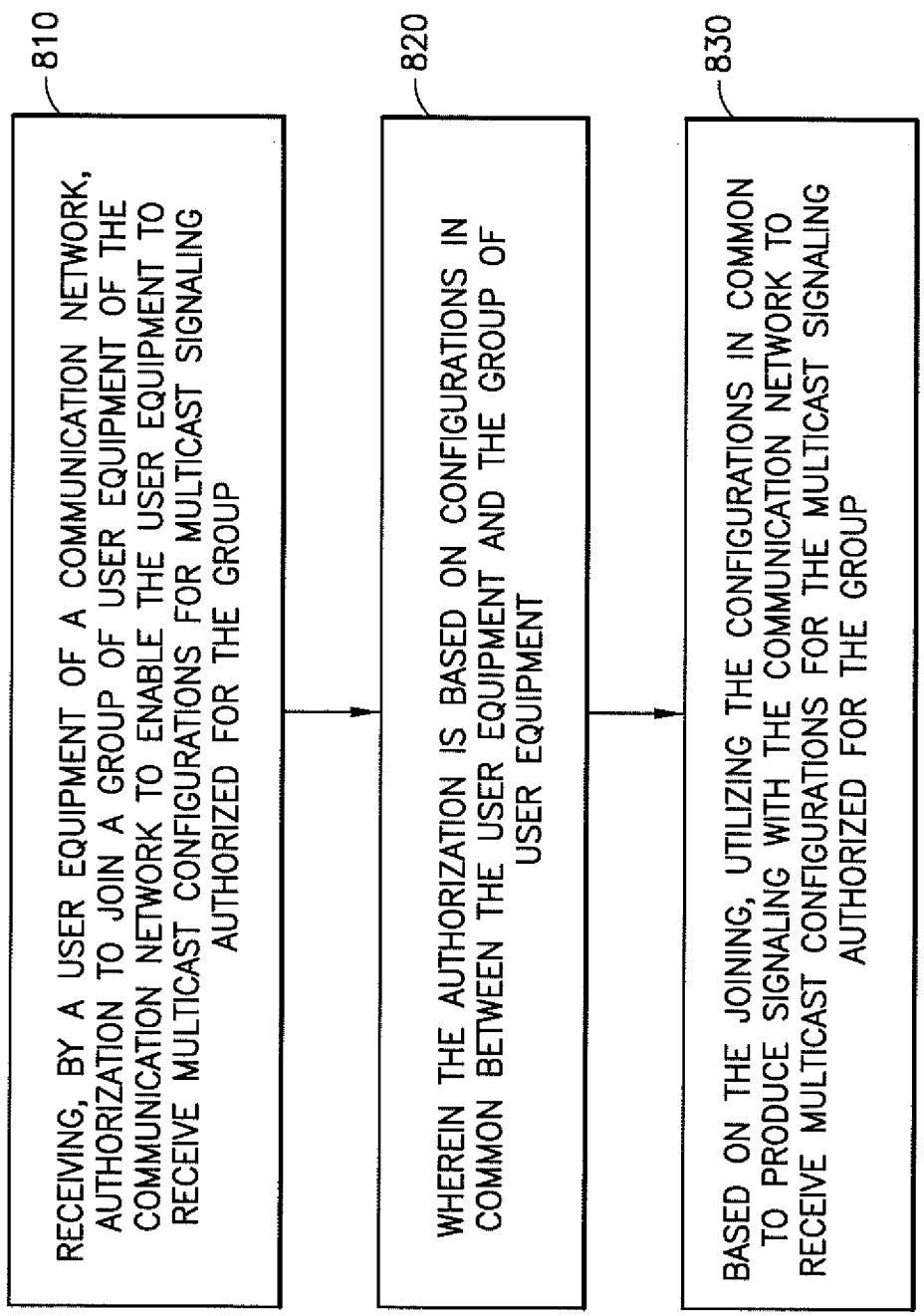

MACHINE LEARNING BASED MULTICAST USER GROUPING

TECHNICAL FIELD

The teachings in accordance with the exemplary embodiments of the present disclosure relate generally to grouping users receiving a multicast service and, more specifically, relate to grouping users receiving a multicast service based on certain relevant attributes of the users.

BACKGROUND

This section is intended to provide a background or context to the example embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
5G Fifth Generation
5GC 5G Core
BWP Bandwidth Part
CSI Channel State Information
CSI-RS CSI-Reference Signal
CSI-IM CSI-Interference Measurement
CQI Channel Quality Information
DM-RS Demodulation Reference Signal
G-RNTI Group common-Radio Network temporary Identifier
HARQ Hybrid Automatic Repeat request
UE User Equipment
L1-RSRP Layer-1 Reference Signal Received Power
MC Multicast
NR New Radio
PDSCH Physical Downlink Shared Channel
PUSCH Physical Uplink Shared Channel
QCI QoS Class Indicator
QoS Quality of Service
RNTI Radio Network Temporary Identifier
RRC Radio Resource Control
TMGI Temporary Mobile Group Identity
UPF User Plane Function Wireless communications systems are continually being updated for advancing deployment of types of communication content such as voice, video, packet data, messaging, broadcast, and so on. These systems may be capable of supporting communication with multiple users by sharing the available system resources, such as multimedia resources. Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). In current technologies a wireless multiple-access communications system may include one or more base stations or one or more network access nodes, each simultaneously supporting communication for multiple communication devices, which may be otherwise known as user equipment (UE).

Wireless communication may include broadcast or multicast ("broadcast/multicast") packets that are communicated between a data network and user equipment (UE) via a wireless communication network. In some wireless technologies, a UE can send broadcast/multicast packets to the data network (DN), and the DN can be responsible for broadcasting/multicasting the packets as downlink broadcast/multicast packets to other UEs in the DN, including transmission of downlink broadcast/multicast packets back to the source UE that originally sent the uplink broadcast/multicast packet.

There is seen to exist a need for further improvements that can be applicable to various multi-access technologies and the telecommunication standards for employing such technologies in communication of data such as broadcast/multicast packets between a network and user equipment (UE), including improvements for multimedia group service operations to communicate such data with participants of a group.

Example embodiments of the present disclosure work to improve at least operations as mentioned above.

SUMMARY

This section contains examples of possible implementations and is not meant to be limiting.

In an exemplary aspect of the present disclosure, there is an apparatus, such as a user equipment side apparatus, comprising: at least one processor; and at least one memory including computer program code, where the at least one memory and the computer program code are configured, with the at least one processor, to cause the apparatus to at least: receive, by a user equipment of a communication network, authorization to join a group of user equipment of the communication network to enable the user equipment to receive multicast configurations for multicast signaling authorized for the group, wherein the authorization is based on configurations in common between the user equipment and the group of user equipment; and based on the joining, utilize the configurations in common to produce signaling with the communication network to receive multicast configurations for the multicast signaling authorized for the group.

In still another example aspect of the present disclosure, there is a method comprising: receiving, by a user equipment of a communication network, authorization to join a group of user equipment of the communication network to enable the user equipment to receive multicast configurations for multicast signaling authorized for the group, wherein the authorization is based on configurations in common between the user equipment and the group of user equipment; and based on the joining, utilizing the configurations in common to produce signaling with the communication network to receive multicast configurations for the multicast signaling authorized for the group.

A further example embodiment is an apparatus or a method comprising the apparatus or the method of the previous paragraph, wherein the authorization is received from the communication network based on feedback from the user equipment using a feedback configuration received from the communication network over a physical downlink control channel, wherein the feedback configuration is associated with a feedback impact variable generated based on at least one of prior data or active ongoing multicast sessions, or utilized classification algorithms based on user context information associated with the user equipment, wherein the configurations in common comprise configurations for a demodulation reference signal and channel state information reference signal in a physical downlink shared channel, wherein the configurations in common comprise configurations for hybrid automatic repeat request and channel state information in a physical uplink shared channel, wherein the authorization is based on acknowledgement or negative acknowledgement feedback information from the user equipment comprising uplink channel state information or hybrid automatic repeat request communicated with the communication network, wherein the authorization is based on information from the user equipment enabling identification of at least one of: Group common-Radio Network temporary Identifiers or a temporary mobile group identity of the user equipment indicating multicast services the user equipment is required to consume, mobility parameters—such as mobility state estimate, handover frequency, mobility parameters such as mobility state estimate, handover frequency, doppler shift measurements associated with the user equipment, at least one of a location or related context of a location of the user equipment, a binary feedback impact variable associated with the user equipment which indicates whether the UE has observed changes in downlink multicast traffic radio transmission parameters based on previous feedback, QoS and reliability requirements of multicast traffic for the user equipment, or at least one of feedback impact variable generated based on prior data, or active ongoing multicast sessions, or utilizing classification algorithms based on user context information, wherein the related context of a location is based on the location being one of a home, office, shopping mall, or outdoor location, wherein the binary feedback impact variable associated with the user equipment comprises at least one of previous feedback or an impact on multicast data transmission parameters or group scheduling, wherein the QoS and reliability requirements of multicast traffic for the user equipment comprises at least one QoS class indicator value related to at least one of packet delay budget or a packet loss value associated with the user equipment, wherein the signaling with the communication network comprises: before starting a multicast session with the communication network, clustering with the group using a contextual feedback configuration, wherein the contextual feedback configuration is based on one of: contextual feedback configuration information received from the communication network, or a contextual feedback configuration determined by the user equipment utilizing a provided model along with the user context information for clustering with the group, wherein a size of the cluster is based on at least one of a number of user equipment for the multicast session, a complexity of the clustering, signalling overhead for configuring different feedback configurations for the UEs in various clusters or interoperability of the user equipment in the cluster, wherein there is utilizing grouping information for a physical downlink control channel specific to the user equipment to communicate a physical uplink control channel feedback configuration for the multicast session, wherein there is utilizing a common physical downlink control channel associated with the group to communicate physical downlink shared channel resources with the communication network for scheduling the multicast session, wherein there is utilizing grouping information for a physical downlink control channel specific to the user equipment to communicate a physical uplink control channel feedback configuration for the multicast session, and/or wherein utilizing grouping information for the physical downlink control channel specific to the user equipment is based on identification of use by the user equipment of more than one Group common-Radio Network temporary Identifiers or temporary mobile group identity in the group.

A non-transitory computer-readable medium storing program code, the program code executed by at least one processor to perform at least the method as described in the paragraphs above.

In yet another example aspect of the present disclosure, there is an apparatus comprising: means for receiving, by a user equipment of a communication network, authorization to join a group of user equipment of the communication network to enable the user equipment to receive multicast configurations for multicast signaling authorized for the group, wherein the authorization is based on configurations in common between the user equipment and the group of user equipment; and means, based on the joining, for utilizing the configurations in common to produce signaling with the communication network to receive multicast configurations for the multicast signaling authorized for the group.

In accordance with the example embodiments as described in the paragraph above, at least the means for receiving, joining, utilizing, and producing comprises a network interface, and computer program code stored on a computer-readable medium and executed by at least one processor.

In another example aspect of the present disclosure, there is an apparatus, such as a network side apparatus, comprising: at least one processor; and at least one memory including computer program code, where the at least one memory and the computer program code are configured, with the at least one processor, to cause the apparatus to at least: determine, by a network node of a communication network, signaling comprising authorization for enabling at least one user equipment of the communication network to join a group of user equipment of the communication network to enable the at least one user equipment authorization to receive multicast configurations for multicast signaling authorized for the group; and based on the signaling, determine at least one of clustering information or classification information for communicating with the at least one user equipment to enable the at least one user equipment to join the group to receive multicast configurations for the multicast signaling authorized for the group.

In still another example aspect of the present disclosure, there is a method comprising: determining, by a network node of a communication network, signaling comprising authorization for enabling at least one user equipment of the communication network to join a group of user equipment of the communication network to enable the at least one user equipment authorization to receive multicast configurations for multicast signaling authorized for the group; and based on the signaling, determining at least one of clustering information or classification information for communicating with the at least one user equipment to enable the at least one user equipment to join the group to receive multicast configurations for the multicast signaling authorized for the group.

A further example embodiment is an apparatus or a method comprising the apparatus or the method of the previous paragraph, wherein the authorization is based on feedback from the user equipment using a feedback configuration provided by the communication network over a physical downlink control channel, wherein the feedback configuration is associated with a feedback impact variable generated based on at least one of prior data or active ongoing multicast sessions, or utilized classification algorithms based on user context information associated with the user equipment, wherein the clustering is based on configurations in common between the at least one user equipment and the group of user equipment for utilizing the configurations in common for production of signaling with the communication network for multicast configurations for the multicast signaling authorized for the group, wherein the configurations in common comprise configurations for a demodulation reference signal and channel state information reference signal in a physical downlink shared channel, wherein the configurations in common comprise configurations for hybrid automatic repeat request and channel state information in a physical uplink shared channel, wherein the authorization is based on acknowledgement or negative acknowledgement feedback from the user equipment comprising uplink channel state information or hybrid automatic repeat request communicated between the at least one user equipment and the communication network, wherein the authorization is based on information from the user equipment enabling identification of at least one of: Group common-Radio Network temporary Identifiers or a temporary mobile group identity of the at least one user equipment indicating multicast services the at least one user equipment is required to consume, mobility parameters—such as mobility state estimate, handover frequency, doppler shift measurements associated with the at least one user equipment, at least one of a location or related context of a location of the at least one user equipment, a binary feedback impact variable for the at least one user equipment which indicates whether the UE has observed changes in downlink multicast traffic radio transmission parameters based on previous feedback, QoS and reliability requirements of multicast traffic for the at least one user equipment, or at least one of feedback impact variable generated based on prior data, or active ongoing multicast sessions, or utilizing classification algorithms based on user context information, wherein the related context of a location is based on the location being one of a home, office, shopping mall, or outdoor location, wherein the binary feedback impact variable from the at least one user equipment comprises at least one of previous feedback or an impact on multicast data transmission parameters or group scheduling, wherein the QoS and reliability requirements of multicast traffic for the at least one user equipment comprises at least one QoS class indicator value related to at least one of packet delay budget or a packet loss value associated with the at least one user equipment, wherein the determining the at least one of clustering information or classification information is using a contextual feedback configuration, wherein a size of the cluster is based on at least one of a number of user equipment for the multicast session, a complexity of the clustering, signalling overhead for configuring different feedback configurations for the UEs in various clusters or interoperability of the at least one user equipment in the cluster, wherein there is receiving from the at least one user equipment over a common physical downlink control channel associated with the group physical downlink shared channel resources associated with the group, wherein there is receiving from the at least one user equipment a physical uplink control channel feedback configuration for the multicast session utilizing grouping information for a physical downlink control channel specific to the at least one user equipment, and/or wherein utilizing grouping information for the physical downlink control channel specific to the user equipment is based on identification of use by the user equipment of more than one Group common-Radio Network temporary Identifiers or temporary mobile group identity in the group.

A non-transitory computer-readable medium storing program code, the program code executed by at least one processor to perform at least the method as described in the paragraphs above.

In yet another example aspect of the present disclosure, there is an apparatus comprising: means for determining, by a network node of a communication network, signaling comprising authorization for enabling at least one user equipment of the communication network to join a group of user equipment of the communication network to enable the at least one user equipment authorization to receive multicast configurations for multicast signaling authorized for the group; and means, based on the signaling, for determining at least one of clustering information or classification information for communicating with the at least one user equipment to enable the at least one user equipment to join the group to receive multicast configurations for the multicast signaling authorized for the group.

In accordance with the example embodiments as described in the paragraph above, at least the means for signaling, determining and enabling comprises a network interface, and computer program code stored on a computer-readable medium and executed by at least one processor.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 8A and FIG. 8B each show a method in accordance with example embodiments of the present disclosure which may be performed by an apparatus.

DETAILED DESCRIPTION

In the present disclosure, there is proposed at least a novel method and apparatus for grouping users receiving a multicast service based on certain relevant attributes of the users.

As part of ongoing studies relating to 5G/NR multicast, 3GPP is defining mechanisms for enabling the delivery of multicast traffic to a multitude of UEs. One of the aims of the studies is to define group scheduling mechanisms that enable the control signaling for the configuration of multicast traffic using the data channel.

In 4G, the group scheduling mechanisms were enabled using semi-static or dynamic broadcast signaling of control information—for evolved multicast broadcast multimedia service (eMBMS) and single-cell point-to-multipoint (SC-PTM). For eMBMS and SC-PTM, due to the support for receive-only mode UEs, there were limitations imposed on the system design—such as the support for devices that are not registered with the network, support for idle mode devices, etc., which had significant impact in terms of how the multicast data/traffic channel (MTCH) and multicast control channel (MCCH) information was sent using the physical channel—using physical downlink shared channel (PDSCH) or physical multicast channel (PMCH).

For 5G NR, the focus has shifted to RRC_Connected mode UEs, which is a departure from previous generations—one which also enables unique enhancements that would help with the optimal delivery of multicast traffic. RRC_Connected mode UEs are UEs that are connected to the network and actively receive and/or transmit data. The enhancements being discussed have been mainly related to downlink data traffic scheduling and reliability enhancements—especially for the delivery of multicast traffic.

Figure 1:
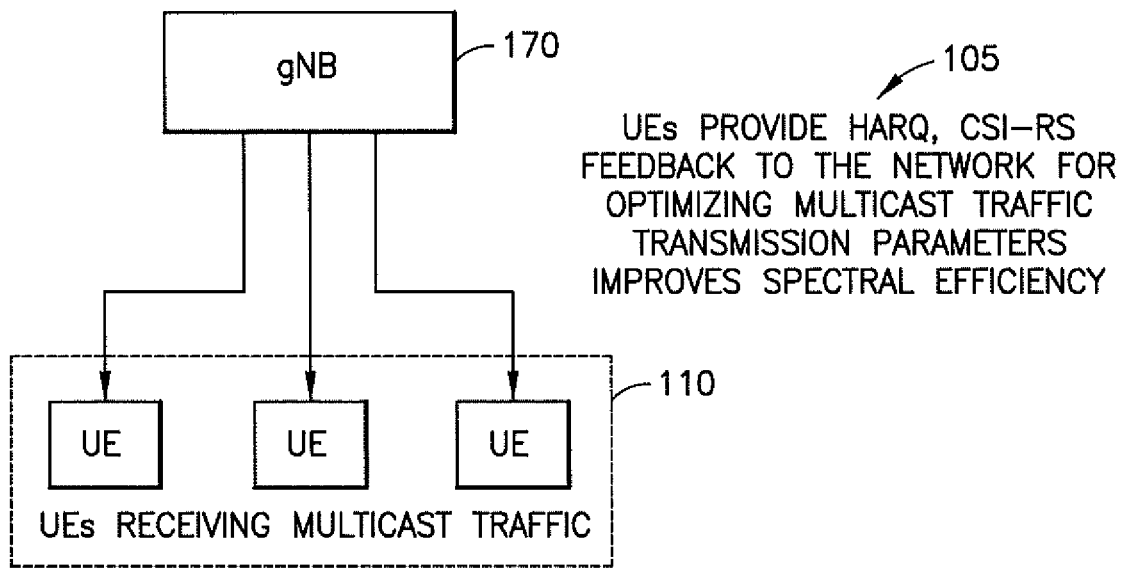
FIG. 1 shows some considerations related to feedback signaling at the time of this application.

FIG. 1 shows some considerations related to feedback signaling at the time of this application. FIG. 1 shows a communication configuration between a gNB 170 and UE 110. As shown in step 105 of FIG. 1, UEs provides HARQ and CSI-RS feedback to the network for optimizing multicast traffic transmission parameters and improving spectral efficiency. HARQ feedback indicates via an acknowledge or non-acknowledge message to the network whether the transmitted data was received by the UE. CSI feedback enables the network to learn the radio conditions experienced by the UE.

Some of the considerations of the ongoing studies include:
 providing explicit reliability requirements for 5G multicast;
 enabling use of CSI and HARQ feedback, and possible PDSCH repetition;
 providing support for RRC connected mode UEs;
 using feedback and PDSCH repetition to enable networks to improve the spectral efficiency of the multicast transmissions;
 enabling such features using group common PDCCH signaling of multicast PDSCH scheduling information; and
 enabling dedicated UE-specific PDCCH signaling of feedback and possible PDSCH repetition information.

Here, the reliability enhancement solutions defined for 5G multicast would be mainly based on static configurations. However, certain optimizations e.g., in terms of feedback resource consumption could be achieved by applying machine learning techniques.

Figure 2:
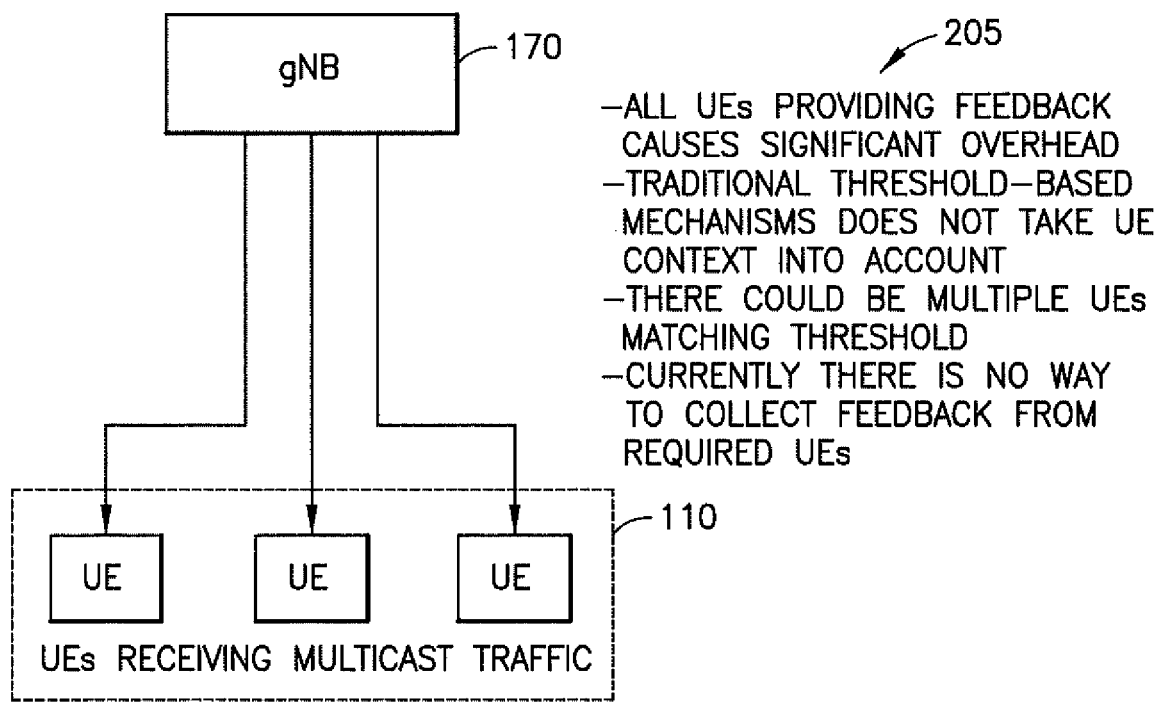
FIG. 2 shows some problems addressed by example embodiments of the present disclosure.

FIG. 2 shows some problems addressed by example embodiments of the present disclosure. As shown in step 205 of FIG. 2, there may be several UEs provide feedback causing significant overhead. Traditional threshold-based mechanisms do not take UE context into account, and there could be multiple UEs matching a threshold. Traditional threshold-based mechanisms are unable to selectively collect feedback from specific UEs.

Example embodiments of the present disclosure addresses the problem of optimizing feedback (e.g., PUCCH-based HARQ ACK-NACK or PRACH) across a large number of users receiving multicast traffic without introducing more signalling overhead. Some of the needs addressed by the present disclosure include:
 a need for scalability of such configurations;
 a need for selecting a subset(s) of UEs for providing feedback;
 a need to account for different attributes (e.g., the location from where the multicast traffic is being consumed) across different users;
 a need to support more contextual mechanisms (e.g., rather than traditional static or heuristics-based algorithms) for identifying when feedback is needed; and
 a need to provide more symmetry between the network and the UEs to help reduce feedback overhead.

As an abstract of Example embodiments of the present disclosure, there is a method proposed which enables the network to group users receiving the same multicast service, based on certain relevant attributes of the users. The grouping—done for e.g., using clustering algorithms such as k-means clustering, enables the network to provide contextual feedback configurations, which improves reliability and minimizes unnecessary feedback, thereby addressing limitations of traditional multicast feedback configurations.

In accordance with example embodiments of the present disclosure, there is proposed operations for a network to group users receiving the same multicast traffic to have common configurations at least for: DM-RS and CSI-RS in PDSCH; and/or HARQ and CSI feedback configuration in PUSCH.

Figure 7:
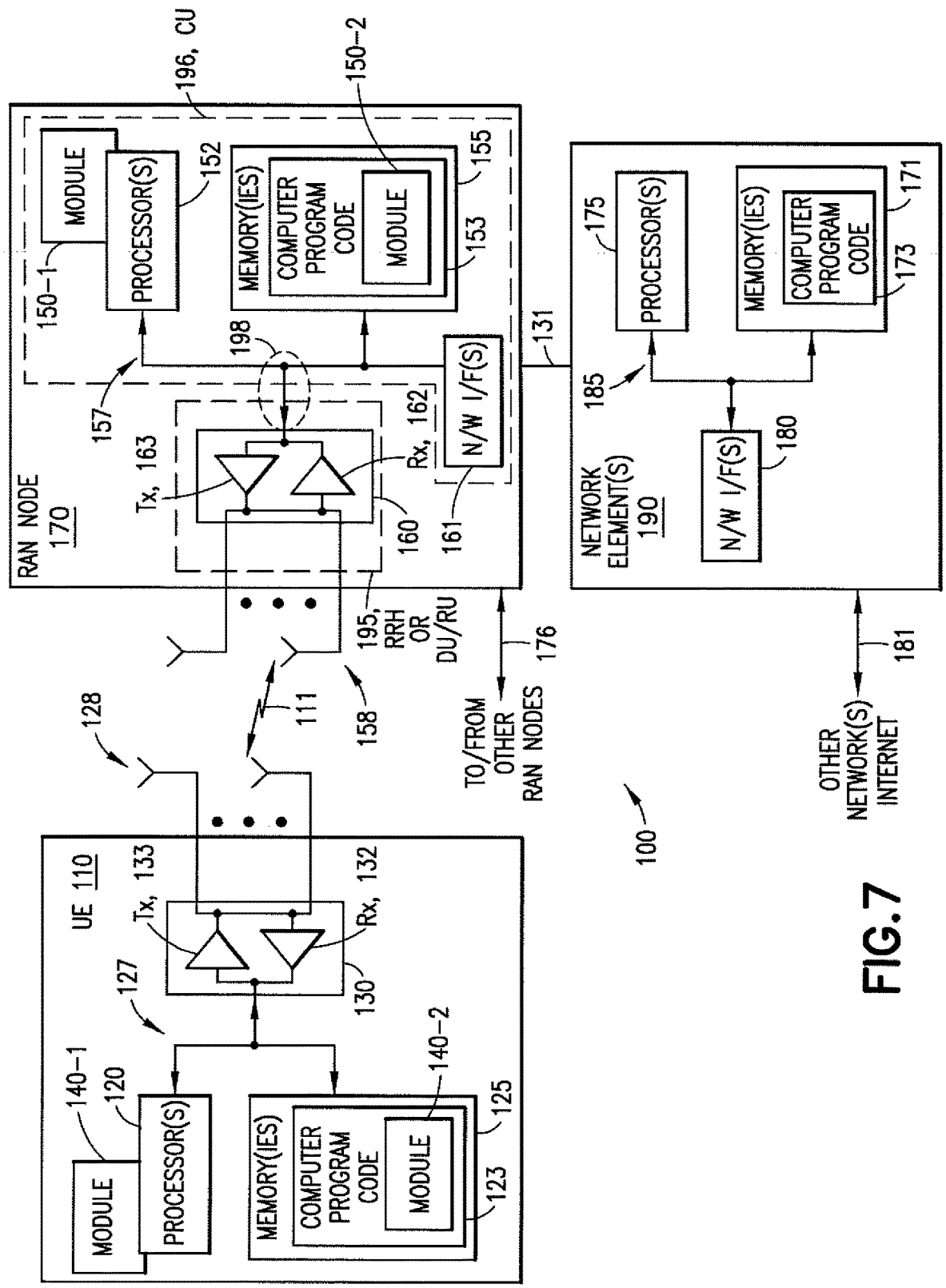
FIG. 7 shows a high level block diagram of various devices used in carrying out various aspects of the present disclosure.

Before describing example embodiments of the present disclosure in further detail, reference is made to FIG. 7.

Turning to FIG. 7, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an eNB. A gNB is a node providing NR user plane and control plane protocol terminations towards the UE, and connected via the NG interface to a 5GC (such as, for example, the network element(s) 190). The Network Element(s) 190 may or may not include a NCE/MME/SGW/UDM/PCF/AMF/SMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management (AMF) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application.

The eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers.

Figure 3:
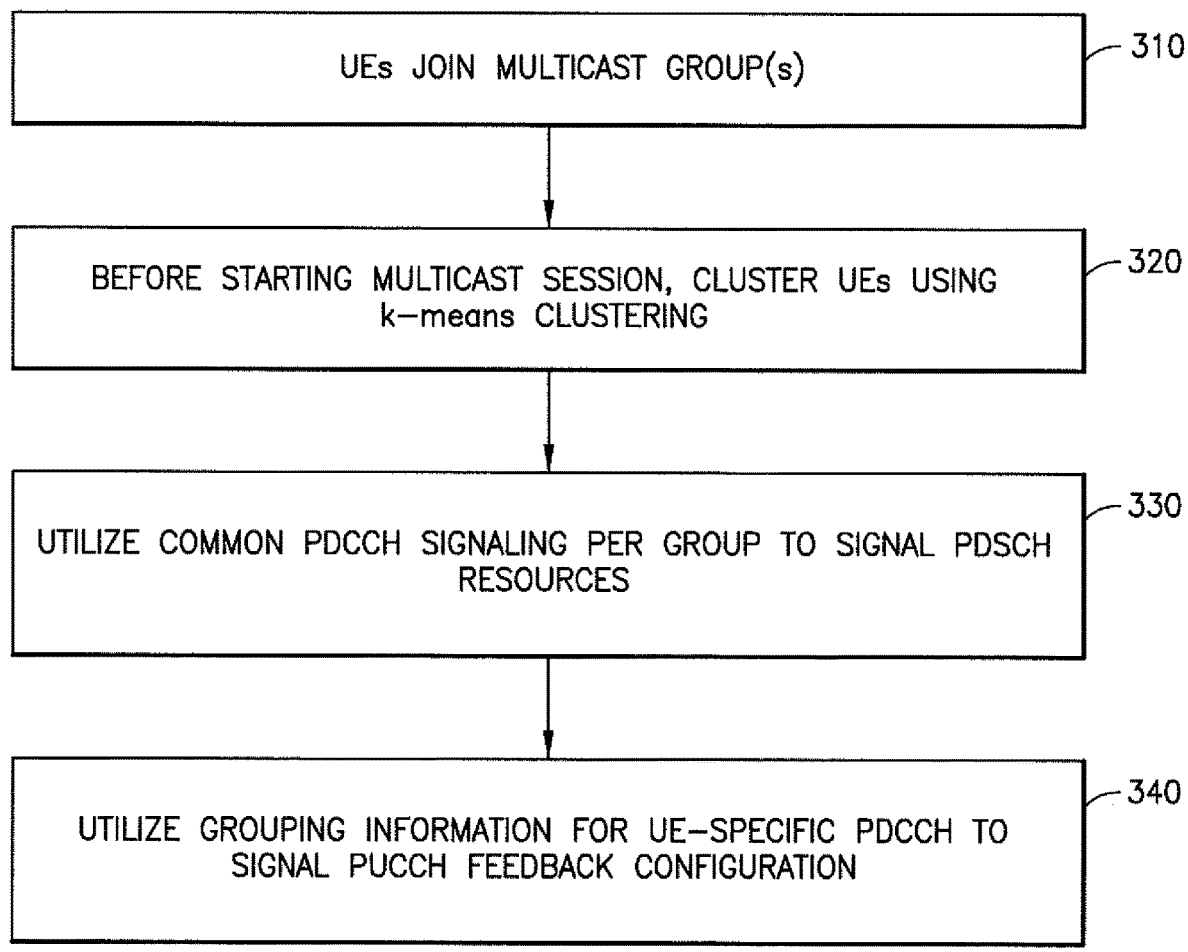
FIG. 3 shows an overview of one proposed method in accordance with example embodiments of the present disclosure.

FIG. 3 shows an overview of one proposed method in accordance with example embodiments of the present disclosure. As shown in step 310 of FIG. 3 UE(s) join multicast group(s). In step 320 of FIG. 3, before starting multicast session(s), the network requests additional feedback from the UE(s) regarding location context, mobility parameters, feedback impact of prior or active/ongoing multicast traffic. As shown with indication 330 of FIG. 3, the network clusters the UE(s) into different groups based on provided feedback. The network may cluster the UE(s) using e.g., k-means clustering, and/or the like. The cluster size may be determined by the network based on but not limited to a number of users in the session, complexity e.g., of signalling overhead for configuring different feedback configurations for UEs in various clusters, or interoperability of the user equipment in the cluster, and/or another factor. As shown in step 340 of FIG. 3 there is utilizing by the network common PDCCH per group to signal PDSCH resources. In step 350 of FIG. 3 there is utilizing by the network and the UE(s) group information for UE-specific PDCCH to signal PUCCH feedback configuration(s).

In accordance with example embodiments of the present disclosure as similarly stated above, there is at least proposed operations for a network to group users (e.g., UEs) receiving the same multicast traffic to have common configurations for: DM-RS and CSI-RS in PDSCH; HARQ and CSI feedback configuration in PUSCH, and/or the like.

The network groups the UEs based on the following attributes/independent variables:

- G-RNTIs/TMGIs and/or another temporary mobile group identity received by the UEs thereby indicating the services the UEs are interested in consuming;
- Mobility parameters (e.g., a mobility state estimate, a handover frequency, a doppler shift measurement, and/or another parameter associated with the UEs);
- Location and/or related context information (e.g., whether the UEs are located indoors in a home, an office, a shopping mall, and/or the like, or whether the UEs are located outdoors);
- A multicast (MC) feedback impact variable (e.g., a binary feedback impact variable using a step size power or interference determination algorithm) corresponding to potential impact on multicast data transmission parameters/group scheduling; the feedback impact variable can be generated using prior data (e.g., from previous feedback) and/or active ongoing multicast sessions possibly under similar context or features which may indicate whether feedback from the UE resulted in a change of transmit parameters that minimizes error rates of received multicast traffic, and/or utilizing classification algorithms based on user context information; and
- QoS and/or reliability requirements of the multicast traffic (e.g., including QCI values related to packet delay budget and packet loss values).

In accordance with example embodiments of the present disclosure a related context as described above can be based on the location being one of an indoor location or an outdoor location. Such locations can be defined or pre-defined for grouping operations in accordance with example embodiments.

Figure 4:
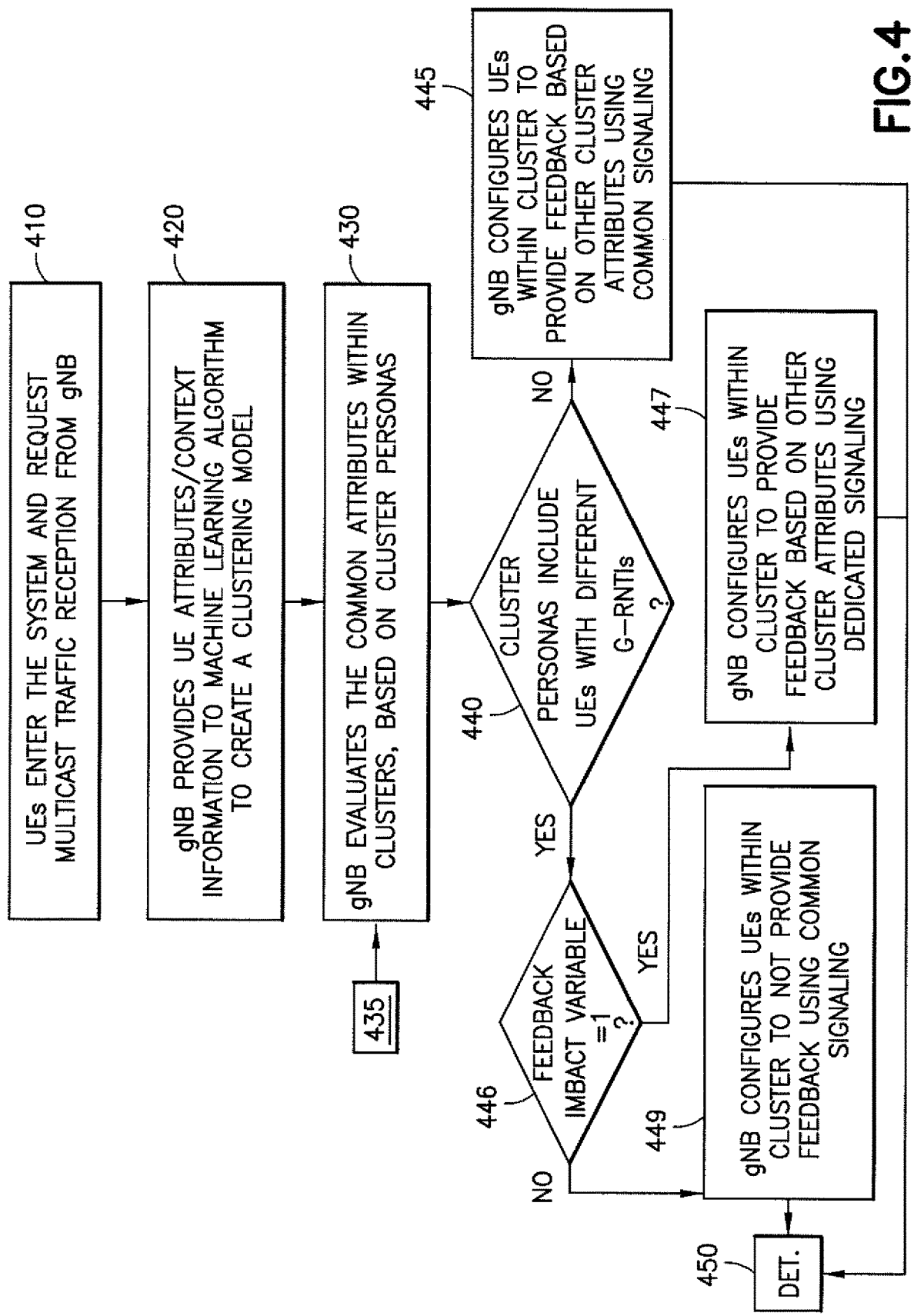
FIG. 4 shows a flow chart of one proposed method in accordance with example embodiments of the present disclosure.

FIG. 4 shows a flow chart of one proposed method in accordance with example embodiments of the present disclosure. The flow chart is shown in FIG. 4 with details related to possible implementation mechanisms that are to be included. In step 410 of FIG. 4 the UE(s) enter the system being a type of communication network system and requests multicast traffic reception from a gNB. As shown in step 420 of FIG. 4 the gNB provides UE attributes and/or context information to a machine learning algorithm to create a clustering model. For example, the machine learning algorithm used could include k-means clustering, e.g., density-based spatial clustering of applications with noise (DB-SCAN), hierarchical clustering, etc., which may provide clusters of UE(s) expecting to receive multicast traffic with common properties. The UE attributes used for clustering could include: G-RNTIs, TMGIs, mobility parameters, doppler-shift, location and/or related context information (e.g., whether the UE(s) are located in a home, an office, a shopping mall, outdoors, etc.), a feedback impact variable (e.g., previous feedback and impact on multicast data transmission parameters and/or group scheduling), QoS and/or reliability requirements, and/or the like. As shown in step 430 of FIG. 4 the gNB evaluates common attributes within clusters based on cluster personas. Further as shown with indication 435 of FIG. 4 the cluster personas could include for example UEs with multiple G-RNTIs within one cluster, in which case gNB may use UE-specific PDCCH signaling to configure feedback configuration(s). As shown in step 440 of FIG. 4 it is determined whether cluster personas include UE(s) with different G-RNTIs. If no, as shown in step 445 of FIG. 4 the gNB configures the UE(s) within a cluster to provide feedback based on other cluster attributes using common signaling. If yes at step 440, then as shown in step 446 it is determined whether a feedback impact variable equals to 1 (e.g., a value indicating feedback impact exists). If no at step 446 then as shown in step 449 of FIG. 4, the gNB configures the UE(s) within the cluster to not provide feedback using common signaling. If yes at step 446 then as shown in step 447 the gNB configures the UE(s) within the cluster to provide feedback based on other cluster attributes using dedicated signaling. Then following either the operations of step 447 or 449 there can be a determination step DET 450 of FIG. 4. At this DET step 450 at least signaling operations may stop for a period of time or determined operations may continue.

Figure 5:
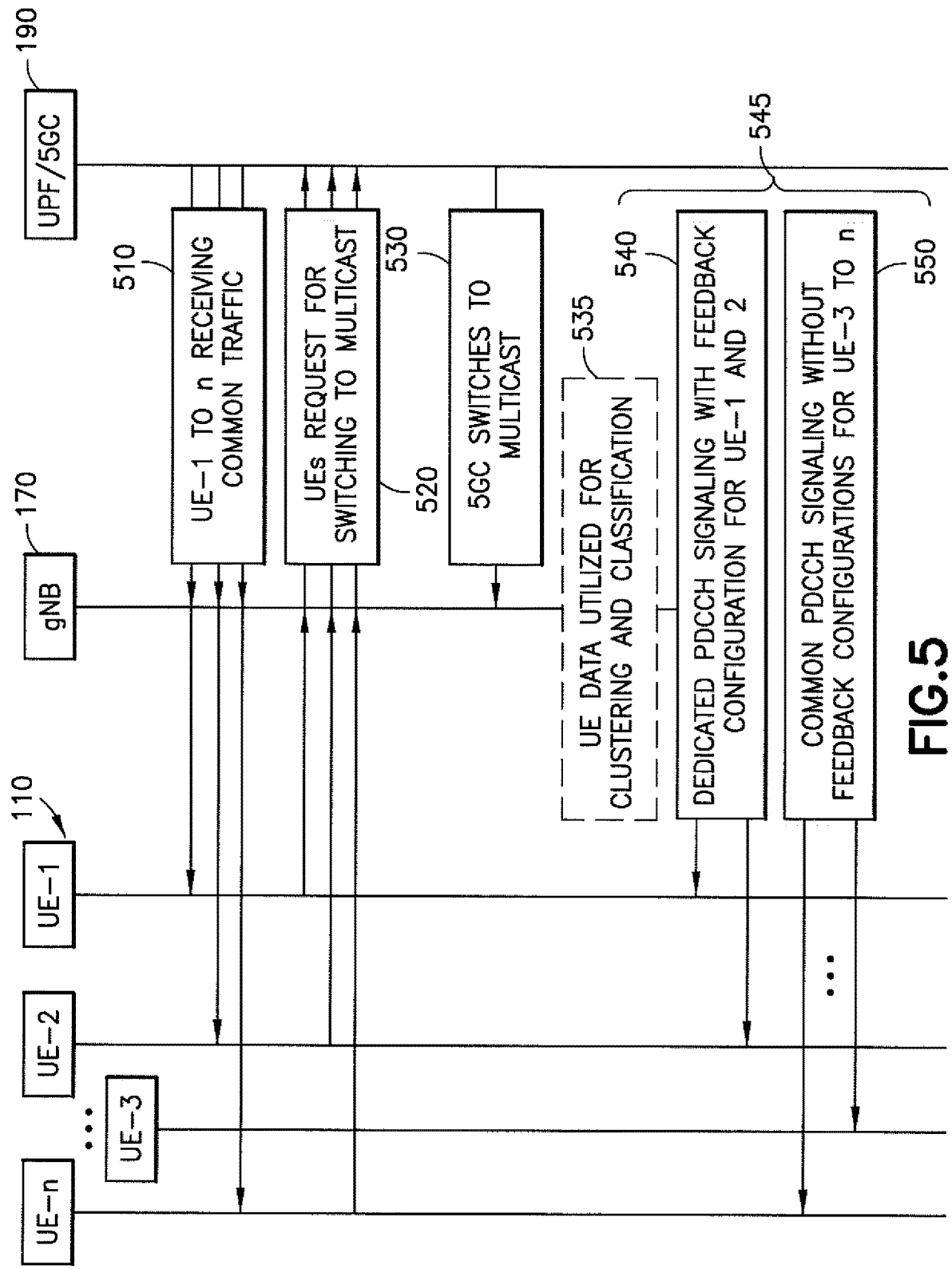
FIG. 5 shows a flow chart of another proposed method in accordance with example embodiments of the present disclosure with feedback impact variable computed at gNB.

FIG. 5 shows a flow chart of another proposed method in accordance with example embodiments of the present disclosure with a feedback impact variable computed at a gNB. FIG. 5 shows communication operations between UE 110 and gNB 170 with assistance from UPF/5GC 190.

As shown in step 510 of FIG. 5 there is communicated between gNB 170, UPF/5GC 190, and UE 110 an indication that UE-1 to UE-n of UE 110 are receiving common traffic. As shown in step 520 of FIG. 5 there is communicated between the network (gNB 170, UPF/5GC 190) and UE 110 an indication of UEs' requests for switching to multicast. As shown in step 530 of FIG. 5 there is communication between UPF/5GC 190 and gNB 170 that the 5GC switches to multicast. As shown in step 535 of FIG. 5 at gNB 170, UE data is used for clustering and classification. As shown in step 540 of FIG. 5 there is communicated between gNB 170 and UE 110 dedicated PDCCH signaling with feedback configuration for, in this case, UE-1 and UE-2 of UE 110. As shown in step 550 of FIG. 5 there is communicated between gNB 170 and UE 110 common PDCCH signaling without feedback configuration for, in this case, UE-3 to UE-n of UE 110. As shown with indication 545 of FIG. 5 for either of step 540 or step 550 there can be signaling configurations based on heuristics defined in gNB 170 which could be in turn based on an outcome of clustering and/or classification models.

It is noted that the possible call flow of a method is shown in FIG. 5 above, where the assumption is that the UEs provide their associated parameters to the network, and the network computes the feedback impact variable. In a non-limiting example as shown in FIG. 5, the gNB determines that UE-1 and UE-2 are to provide uplink feedback that would enable the network to optimize the downlink transmission parameters while the other UEs are to have corresponding uplink feedback disabled.

Figure 6:
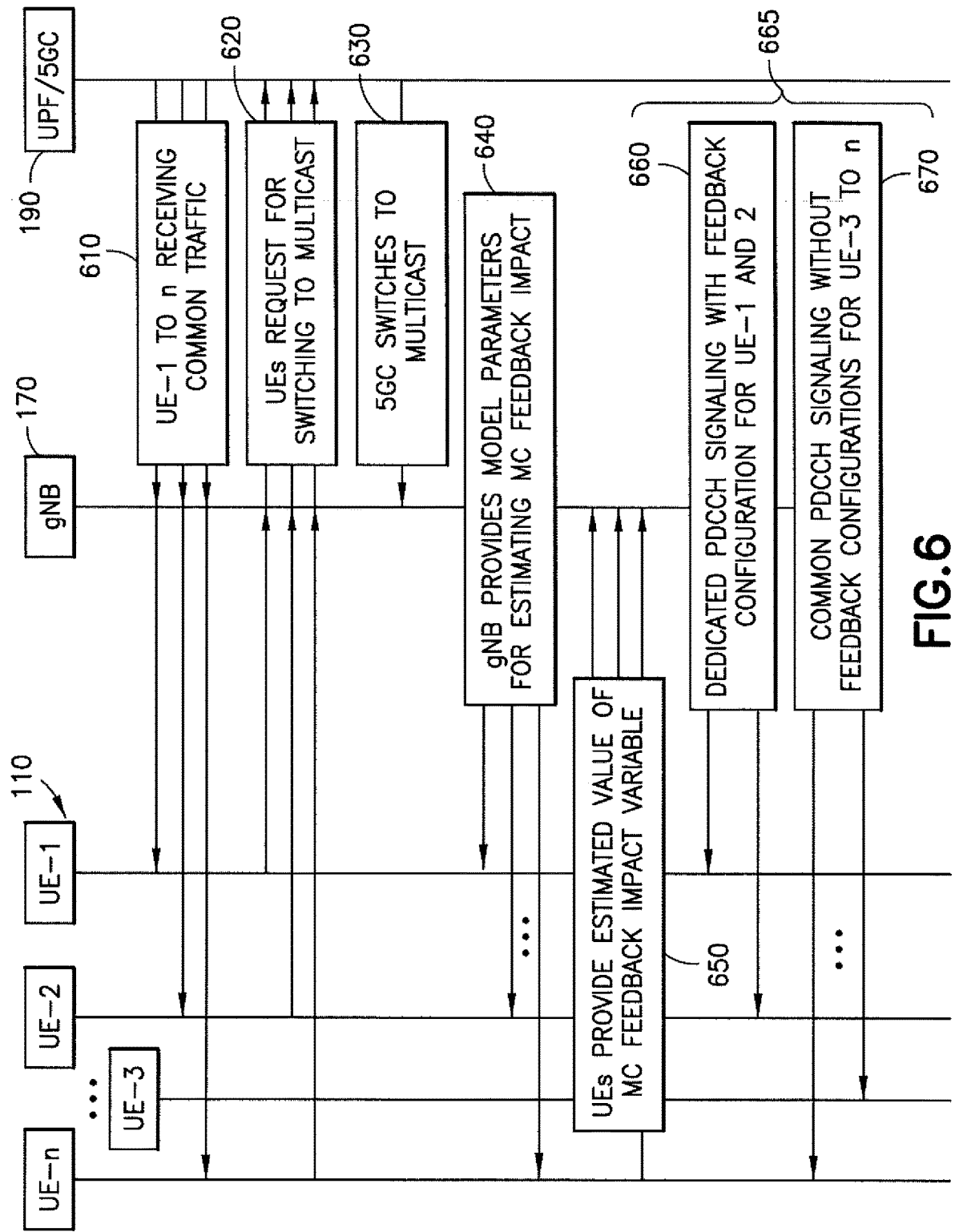
FIG. 6 shows a flow chart of still another proposed method in accordance with example embodiments of the present disclosure with feedback impact variable computed at UE.

An alternative embodiment is as shown in FIG. 6 where the gNB signals model parameters to the UEs along with feature parameters, including data provided by the UEs that may be relevant for computing the MC feedback impact variable.

FIG. 6 shows a flow chart of a proposed method in accordance with example embodiments of the present disclosure with feedback impact variables computed at UEs. As shown in FIG. 6 there are communications between UE 110, gNB 170, and UPF/5GC 190. As shown in step 610 of FIG. 6 there is communicated between the network (gNB 170, UPF/5GC 190) and UE 110 an indication that UE-1 to UE-n are receiving common traffic. As shown in step 620 of FIG. 6 there is communicated from UE 110 to gNB 170 UEs' requests for switching to multicast. In step 630 of FIG. 6 UPF/5GC and gNB 170 communicate a 5GC switching to multicast. As shown in step 640 of FIG. 6 gNB 170 provides model parameters for estimating MC feedback impact. In step 650 of FIG. 6, UE 110 provides an estimated value of a MC feedback impact variable. As shown in step 660 of FIG. 6 there is communicated between gNB 170 and UE 110 dedicated PDCCH signaling with feedback configuration for, in this case, UE-1 and UE-2 of UE 110. Then as shown in step 670 of FIG. 6 there is communicated between gNB 170 and UE 110 common PDCCH signaling without feedback configuration for, in this case, UE-3 to UE-n of UE 110. As shown in step 665 of FIG. 6 there is intended to be shown that for either of step 660 or step 670 there is signaling configurations based on model parameters defined for gNB 170 with values estimated for UE 110.

In the example shown in FIG. 6, UE-1 and UE-2 indicate that providing feedback for the multicast traffic would be beneficial for the gNB in terms of adapting the downlink transmission parameters, and hence are configured with dedicated PDCCH signaling which includes uplink feedback configurations. For UE-3 to UE-n, since the transmission of uplink CSI or HARQ ACK/NACK feedback is shown to have low impact on the downlink transmission parameters as indicated by the MC feedback impact variable, corresponding uplink feedback is not configured. In the scenario where UEs provide MC feedback impact variables as a feedback parameter to the gNB, the network could opt not to use a clustering algorithm for grouping the UEs but rather rely on the UEs utilizing the provided model along with the UE context information to make the decision in a distributed manner.

The UEs could also report the impact variable information along with classification information or multicast sub-group preference, when the gNB provides the classification/clustering models to the UEs. The models could be signaled to the UEs as part of RRC signaling enhancements along with the multicast-specific parameters such as G-RNTIs, common frequency resource configurations, etc.

FIG. 8A illustrates operations which may be performed by a device such as, but not limited to, a device (e.g., UE 110 as in FIG. 7). As shown in step 810 there is receiving, by a user equipment of a communication network, authorization to join a transmission meant for a group of user equipment of the communication network to enable the user equipment to receive multicast configurations for multicast signaling authorized for the group; as shown in step 820 of FIG. 8A wherein the authorization is based on configurations in common between the user equipment and the group of user equipment; and as shown in step 830 of FIG. 8A there is, based on the joining, utilizing the configurations in common to produce signaling with the communication network to receive multicast configurations for the multicast signaling authorized for the group.

In accordance with the example embodiments as described in the paragraph above, wherein the authorization is received from the communication network based on feedback from the user equipment using a feedback configuration received from the communication network over a physical downlink control channel.

In accordance with the example embodiments as described in the paragraphs above, wherein the feedback configuration is associated with a feedback impact variable generated based on at least one of prior data or active ongoing multicast sessions, or utilized classification algorithms based on user context information associated with the user equipment.

In accordance with the example embodiments as described in the paragraphs above, wherein the configurations in common comprise configurations for a demodulation reference signal and channel state information reference signal in a physical downlink shared channel.

In accordance with the example embodiments as described in the paragraphs above, wherein the configurations in common comprise configurations for hybrid automatic repeat request and channel state information in a physical uplink shared channel.

In accordance with the example embodiments as described in the paragraphs above, wherein the authorization is based on acknowledgement or negative acknowledgement feedback information from the user equipment comprising uplink channel state information or hybrid automatic repeat request communicated with the communication network.

In accordance with the example embodiments as described in the paragraphs above, wherein the authorization is based on information from the user equipment enabling identification of at least one of: Group common-Radio Network temporary Identifiers or a temporary mobile group identity of the user equipment indicating multicast services the user equipment is required to consume, mobility parameters such as mobility state estimate, handover frequency, doppler shift measurements associated with the user equipment, at least one of a location or related context of a location of the user equipment, a binary feedback impact variable associated with the user equipment which indicates whether the UE has observed changes in downlink multicast traffic radio transmission parameters based on previous feedback, QoS and reliability requirements of multicast traffic for the user equipment, or at least one of feedback impact variable generated based on prior data, or active ongoing multicast sessions, or utilizing classification algorithms based on user context information.

In accordance with the example embodiments as described in the paragraphs above, wherein the related context of a location is based on the location being one of a home, office, shopping mall, or outdoor location.

In accordance with the example embodiments as described in the paragraphs above, wherein the binary feedback impact variable associated with the user equipment comprises at least one of previous feedback or an impact on multicast data transmission parameters or group scheduling.

In accordance with the example embodiments as described in the paragraphs above, wherein the QoS and reliability requirements of multicast traffic for the user equipment comprises at least one QoS class indicator value related to at least one of packet delay budget or a packet loss value associated with the user equipment.

In accordance with the example embodiments as described in the paragraphs above, wherein the signaling with the communication network comprises: before starting a multicast session with the communication network, clustering with the group using a contextual feedback configuration.

In accordance with the example embodiments as described in the paragraphs above, wherein the contextual feedback configuration is based on one of: contextual feedback configuration information received from the communication network, or a contextual feedback configuration determined by the user equipment utilizing a provided model along with the user context information for clustering with the group.

In accordance with the example embodiments as described in the paragraphs above, wherein a size of the cluster is based on at least one of a number of user equipment for the multicast session, a complexity of the clustering, signalling overhead for configuring different feedback configurations for the UEs in various clusters or interoperability of the user equipment in the cluster.

In accordance with the example embodiments as described in the paragraphs above, there is utilizing grouping information for a physical downlink control channel specific to the user equipment to communicate a physical uplink control channel feedback configuration for the multicast session.

In accordance with the example embodiments as described in the paragraphs above, there is utilizing a common physical downlink control channel associated with the group to communicate physical downlink shared channel resources with the communication network for scheduling the multicast session.

In accordance with the example embodiments as described in the paragraphs above, there is utilizing grouping information for a physical downlink control channel specific to the user equipment to communicate a physical uplink control channel feedback configuration for the multicast session.

In accordance with the example embodiments as described in the paragraphs above, wherein utilizing grouping information for the physical downlink control channel specific to the user equipment is based on identification of use by the user equipment of more than one Group Common-Radio Network temporary Identifiers or temporary mobile group identity in the group.

A non-transitory computer-readable medium (Memory(ies) 125 as in FIG. 7) storing program code (Computer Program Code 123 and/or Module 140-2 as in FIG. 7), the program code executed by at least one processor (Processor(s) 120 and/or Module 140-1 as in FIG. 7) to perform the operations as at least described in the paragraphs above.

In accordance with an example embodiment of the present disclosure as described above there is an apparatus comprising: means for receiving (One or more transceivers 130, Memory(ies) 125, Computer Program Code 123 and/or Module 140-2, and Processor(s) 120 and/or Module 140-1 as in FIG. 7), by a user equipment (UE 110 as in FIG. 7) of a communication network (Network 100 as in FIG. 7), authorization to join a group of user equipment of the communication network to enable the user equipment to receive (One or more transceivers 130, Memory(ies) 125, Computer Program Code 123 and/or Module 140-2, and Processor(s) 120 and/or Module 140-1 as in FIG. 7) multicast configurations for multicast signaling authorized for the group, wherein the authorization is based on configurations in common between the user equipment and the group of user equipment; and means, based on the joining, for utilizing (One or more transceivers 130, Memory(ies) 125, Computer Program Code 123 and/or Module 140-2, and Processor(s) 120 and/or Module 140-1 as in FIG. 7) the configurations in common to produce (One or more transceivers 130, Memory(ies) 125, Computer Program Code 123 and/or Module 140-2, and Processor(s) 120 and/or Module 140-1 as in FIG. 7) signaling with the communication network to receive multicast configurations for the multicast signaling authorized for the group.

In the example aspect of the present disclosure according to the paragraph above, wherein at least the means for receiving, joining, utilizing, and producing comprises a non-transitory computer readable medium [Memory(ies) 125 as in FIG. 7] encoded with a computer program [Computer Program Code 123 and/or Module 140-2 as in FIG. 7] executable by at least one processor [Processor(s) 120 and/or Module 140-1 as in FIG. 7].

Figure 8B:
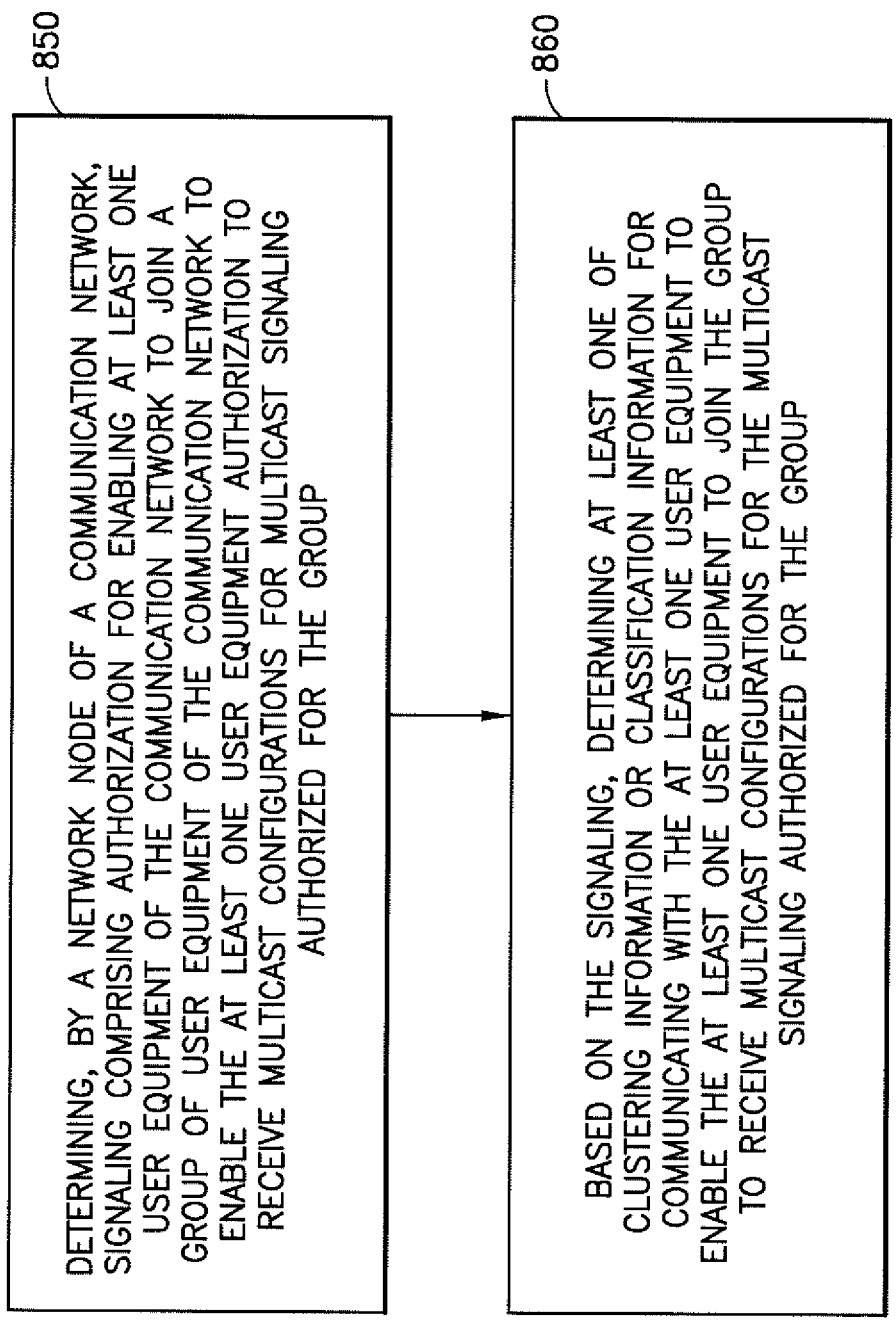

FIG. 8B illustrates operations which may be performed by a network device such as, but not limited to, a RAN node 170 as in FIG. 7 or an eNB or gNB. As shown in step 850 of FIG. 8B there is determining, by a network node of a communication network, signaling comprising authorization for enabling at least one user equipment of the communication network to join a group of user equipment of the communication network to enable the at least one user equipment authorization to receive multicast configurations for multicast signaling authorized for the group; and as shown in step 860 of FIG. 8B there is, based on the signaling, determining at least one of clustering information or classification information for communicating with the at least one user equipment to enable the at least one user equipment to join the group to receive multicast configurations for the multicast signaling authorized for the group.

In accordance with the example embodiments as described in the paragraph above, wherein the authorization is based on feedback from the user equipment using a feedback configuration provided by the communication network over a physical downlink control channel.

In accordance with the example embodiments as described in the paragraphs above, wherein the feedback configuration is associated with a feedback impact variable generated based on at least one of prior data or active ongoing multicast sessions, or utilized classification algorithms based on user context information associated with the user equipment.

In accordance with the example embodiments as described in the paragraphs above, wherein the clustering is based on configurations in common between the at least one user equipment and the group of user equipment for utilizing the configurations in common for production of signaling with the communication network for multicast configurations for the multicast signaling authorized for the group.

In accordance with the example embodiments as described in the paragraphs above, wherein the configurations in common comprise configurations for a demodulation reference signal and channel state information reference signal in a physical downlink shared channel.

In accordance with the example embodiments as described in the paragraphs above, wherein the configurations in common comprise configurations for hybrid automatic repeat request and channel state information in a physical uplink shared channel.

In accordance with the example embodiments as described in the paragraphs above, wherein the authorization is based on acknowledgement or negative acknowledgement feedback from the user equipment comprising uplink channel state information or hybrid automatic repeat request communicated between the at least one user equipment and the communication network.

In accordance with the example embodiments as described in the paragraphs above, wherein the authorization is based on information from the user equipment enabling identification of at least one of: Group common-Radio Network temporary Identifiers or a temporary mobile group identity of the at least one user equipment indicating multicast services the at least one user equipment is required to consume, mobility parameters—such as mobility state estimate, handover frequency, doppler shift measurements associated with the at least one user equipment, at least one of a location or related context of a location of the at least one user equipment, a binary feedback impact variable for the at least one user equipment which indicates whether the UE has observed changes in downlink multicast traffic radio transmission parameters based on previous feedback, QoS and reliability requirements of multicast traffic for the at least one user equipment, or at least one of feedback impact variable generated based on prior data, or active ongoing multicast sessions, or utilizing classification algorithms based on user context information.

In accordance with the example embodiments as described in the paragraphs above, wherein the related context of a location is based on the location being one of a home, office, shopping mall, or outdoor location.

In accordance with the example embodiments as described in the paragraphs above, wherein the binary feedback impact variable from the at least one user equipment comprises at least one of previous feedback or an impact on multicast data transmission parameters or group scheduling.

In accordance with the example embodiments as described in the paragraphs above, wherein the QoS and reliability requirements of multicast traffic for the at least one user equipment comprises at least one QoS class indicator value related to at least one of packet delay budget or a packet loss value associated with the at least one user equipment.

In accordance with the example embodiments as described in the paragraphs above, wherein the determining the at least one of clustering information or classification information is using a contextual feedback configuration.

In accordance with the example embodiments as described in the paragraphs above, wherein a size of the cluster is based on at least one of a number of user equipment for the multicast session, a complexity of the clustering, signalling overhead for configuring different feedback configurations for the UEs in various clusters or interoperability of the at least one user equipment in the cluster.

In accordance with the example embodiments as described in the paragraphs above, there is receiving from the at least one user equipment over a common physical downlink control channel associated with the group physical downlink shared channel resources associated with the group.

In accordance with the example embodiments as described in the paragraphs above, the is receiving from the at least one user equipment a physical uplink control channel feedback configuration for the multicast session utilizing grouping information for a physical downlink control channel specific to the at least one user equipment.

In accordance with the example embodiments as described in the paragraphs above, wherein utilizing grouping information for the physical downlink control channel specific to the user equipment is based on identification of use by the user equipment of more than one Group Common-Radio Network temporary Identifiers or temporary mobile group identity in the group.

A non-transitory computer-readable medium (Memory(ies) 155 as in FIG. 7) storing program code (Computer Program Code 153 and/or Module 150-2 as in FIG. 7), the program code executed by at least one processor (Processor(s) 152 and/or Module 150-1 as in FIG. 7) to perform the operations as at least described in the paragraphs above.

In accordance with an example embodiment of the present disclosure as described above there is an apparatus comprising: means for determining (One or more transceivers 160, Memory(ies) 156, Computer Program Code 153 and/or Module 150-2, and Processor(s) 152 and/or Module 150-1 as in FIG. 7), by a network node (Ran node 170 as in FIG. 7) of a communication network (Network 100 as in FIG. 7), signaling comprising authorization for enabling at least one user equipment of the communication network to join a group of user equipment of the communication network to enable the at least one user equipment authorization to receive multicast configurations for multicast signaling authorized for the group; and means, based on the signaling, for determining (One or more transceivers 160, Memory(ies) 156, Computer Program Code 153 and/or Module 150-2, and Processor(s) 152 and/or Module 150-1 as in FIG. 7) at least one of clustering information or classification information for communicating with the at least one user equipment to enable the at least one user equipment to join the group to receive multicast configurations for the multicast signaling authorized for the group In the example aspect of the present disclosure according to the paragraph above, wherein at least the means for signaling, determining and enabling comprises a non-transitory computer readable medium [Memory(ies) 156 as in FIG. 7] encoded with a computer program [Computer Program Code 153 and/or Module 150-2 as in FIG. 7] executable by at least one processor [Processor(s) 152 and/or Module 150-1 as in FIG. 7].

Some Advantages of Example Embodiments of the Present Disclosure

Implementation of advanced machine learning techniques to enable network devices to configure the optimal group of UEs with appropriate feedback;

Increases the spectral efficiency of the network by avoiding unnecessary feedback; and Improves system operation with meaningful feedback from UEs using learned models related to UE context In addition, in accordance with example embodiments of the present disclosure there is circuitry for performing operations in accordance with example embodiments of the present disclosure as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the present disclosure as described herein.

In accordance with example embodiments of the present disclosure as disclosed in this application this application, the "circuitry" provided can include at least one or more or all of the following:
 (a) hardware-only circuit implementations (such as implementations in only analog and/or digital circuitry);
 (b) combinations of hardware circuits and software, such as (as applicable): (i) a combination of analog and/or digital hardware circuit(s) with software/firmware; and
(ii) any portions of hardware processor(s) with software (including digital signal processor(s)), software, and memory(ies) that work together to cause an apparatus, such as a mobile phone or server, to perform various functions, such as functions or operations in accordance with example embodiments disclosed herein); and (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the present disclosure, there is adequate circuitry for performing at least novel operations as disclosed in this application, this 'circuitry' as may be used herein refers to at least the following:

(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the present disclosure is not limited thereto. While various aspects of the present disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the present disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the present disclosure and not to limit the scope of the present disclosure which is defined by the claims.

The foregoing description has provided by way of exemplary and non-limiting examples a full and informative description of the best method and apparatus presently contemplated by the inventors for carrying out the present disclosure. However, various modifications and adaptations may become apparent to those skilled in the relevant arts in view of the foregoing description, when read in conjunction with the accompanying drawings and the appended claims. However, all such and similar modifications of the teachings of the present disclosure will still fall within the scope of the present disclosure .

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of the present disclosure could be used to advantage without the corresponding use of other features. As such, the foregoing description should be considered as merely illustrative of the principles of the present disclosure, and not in limitation thereof.

What is claimed is:

1. A method, comprising:
receiving, by a user equipment of a communication network, authorization to join a group of user equipment of the communication network to enable the user equipment to receive multicast configurations for multicast signaling authorized for the group,
wherein the authorization is based on configurations and attributes used for clustering in common between the user equipment and the group of user equipment; and
based on the joining, utilizing the configurations and the attributes used for clustering in common to receive multicast configurations for the multicast signaling authorized for the group.

2. The method of claim 1, wherein the authorization is received from the communication network based on feedback from the user equipment using a feedback configuration received from the communication network over a physical downlink control channel.

3. The method of claim 2, wherein the feedback configuration is associated with a feedback impact variable generated based on at least one of prior data or active ongoing multicast sessions, or utilized classification algorithms based on user context information associated with the user equipment.

4. The method of claim 1, wherein the configurations used for clustering in common comprise one of:

configurations for a demodulation reference signal and channel state information reference signal in a physical downlink shared channel; or configurations for hybrid automatic repeat request and channel state information in a physical uplink shared channel, and wherein the attributes used for clustering in common comprise at least one of:

a radio network temporary identifier, a temporary mobile group identity, a mobility parameter, a doppler shift, location context information, or an indication of a specific location of the user equipment.

5. The method of claim 1, wherein the authorization is based on acknowledgement or negative acknowledgement feedback information from the user equipment comprising uplink channel state information or hybrid automatic repeat request communicated with the communication network.

6. The method of claim 1, wherein the authorization is based on information from the user equipment enabling identification of at least one of:

a temporary mobile group identity of the user equipment, a mobility parameter associated with the user equipment, at least one of a location or related context of a location of the user equipment, a feedback impact variable associated with the user equipment, or at least one of a quality of service or a reliability requirement of multicast traffic for the user equipment.

7. The method of claim 6, wherein the related context is based on the location being one of an indoor location or an outdoor location.

8. The method of claim 6, wherein the feedback impact variable associated with the user equipment comprises at least one of previous feedback or an impact on multicast data transmission parameters or group scheduling.

9. The method of claim 6, wherein the at least one of the quality of service or the reliability requirement of multicast traffic for the user equipment comprises at least one quality of service class indicator value related to at least one of packet delay budget or a packet loss value associated with the user equipment.

10. The method of claim 6, wherein the signaling with the communication network comprises:

before starting a multicast session with the communication network, clustering with the group using a contextual feedback configuration.

11. The method of claim 10, wherein the contextual feedback configuration is based on one of:

contextual feedback configuration information received from the communication network, or a contextual feedback configuration determined by the user equipment utilizing a provided model along with the user context information for clustering with the group.

12. The method of claim 11, wherein a size of the cluster is based on at least one of a number of user equipment for the multicast session, a complexity of the clustering signalling overhead for configuring different feedback configurations for the UEs user equipment in various clusters, or interoperability of the user equipment in the cluster.

13. The method according to claim 10, comprising:

utilizing grouping information for a physical downlink control channel specific to the user equipment to communicate a physical uplink control channel feedback configuration for the multicast session.

14. A method, comprising:

determining, by a network node of a communication network, signaling comprising authorization for enabling at least one user equipment of the communication network to join a communication meant for a group of user equipment of the communication network, wherein the authorization is based on configurations and attributes used for clustering in common between the at least one user equipment and the group; and based on the signaling, determining at least one of clustering information or classification information for communicating with the at least one user equipment to enable the at least one user equipment to utilize at least the configurations and the attributes used for clustering in common to receive multicast configurations for multicast signaling authorized for the group.

15. The method of claim 14, wherein the authorization is based on feedback from the user equipment using a feedback configuration provided by the communication network over a physical downlink control channel.

16. The method of claim 15, wherein the feedback configuration is associated with a feedback impact variable generated based on at least one of prior data or active ongoing multicast sessions, or utilized classification algorithms based on user context information associated with the user equipment.

17. The method of claim 14, wherein the clustering is based on the configurations and attributes used for clustering in common between the at least one user equipment and the group of user equipment, and the clustering information is used for configuring common feedback signaling between the users within the cluster and the communication network.

18. The method of claim 17, wherein the configurations used for clustering in common comprises one of:

configurations for a demodulation reference signal and channel state information reference signal in a physical downlink shared channel; or configurations for hybrid automatic repeat request and channel state information in a physical uplink shared channel.

19. The method of claim 14, further comprising:

transmitting toward the at least one user equipment over a common physical downlink control channel associated with the physical downlink shared channel resources associated with the group.

20. An apparatus, comprising:

at least one processor; and at least one non-transitory memory storing instructions, that when executed by the at least one processor, to-cause the apparatus to at least:

determine, by a network node of a communication network, signaling comprising authorization for enabling at least one user equipment of the communication network to join a group of user equipment of the communication network to enable the at least one user equipment authorization to receive multicast configurations for multicast signaling authorized for the group, wherein the authorization is based on configurations and attributes used for clustering in common between the at least one user equipment and the group; and based on the signaling, determine at least one of clustering information or classification information for communicating with the at least one user equipment to enable the at least one user equipment to utilize at least the configurations and the attributes used for clustering in common to join the communication meant for the group to receive multicast configurations for the multicast signaling authorized for the group.

* * * * *